United States Patent [19]

Ushioda et al.

[11] 4,436,861
[45] Mar. 13, 1984

[54] POLYVINYL CHLORIDE CONTAINING ALKYL ACRYLATE AND ALKYL METHACRYLATE SEQUENTIALLY POLYMERIZED THEREON

[75] Inventors: Minoru Ushioda, Amagasaki; Kenji Ueno; Hiroyasu Furukawa, both of Takasago; Masahiro Kobayashi, Amagasaki, all of Japan

[73] Assignee: Kanegafuchi Kagaku Kogyo Kabushiki Kaisha, Osaka, Japan

[21] Appl. No.: 358,889

[22] Filed: Mar. 17, 1982

[30] Foreign Application Priority Data

Mar. 19, 1981 [JP] Japan ................... 56-41259

[51] Int. Cl.³ .................. C08L 27/22; C08F 259/04
[52] U.S. Cl. .................. 524/425; 524/533; 525/228; 525/309
[58] Field of Search ............... 525/309; 524/425, 533

[56] References Cited

U.S. PATENT DOCUMENTS 3,859,384 1/1975 Carty et al. ................. 525/309
3,903,198 9/1975 Wei ........................ 525/309
3,928,500 12/1975 Kraft et al. ................ 525/309

FOREIGN PATENT DOCUMENTS 1093974 11/1966 United Kingdom ........... 525/311

Primary Examiner—Wilbert J. Briggs, Sr.
Attorney, Agent, or Firm—Armstrong, Nikaido, Marmelstein & Kubovcik

[57] ABSTRACT

A particulate vinyl chloride polymer having excellent processability and heat stability which comprises porous vinyl chloride polymer particles and acrylic polymers which are included in the above porous particles. The particulate polymer is prepared by impregnating an alkyl acrylate in porous particles of a vinyl chloride polymer, polymerizing it, and in the course of the polymerization of the alkyl acrylate, adding an alkyl methacrylate to the polymerization system and continuing the polymerization. Since the thus obtained polymer has an improved melt-flowability and heat stability, it can be blended with a large quantity of an inorganic filler and can be molded with good processability.

7 Claims, No Drawings

POLYVINYL CHLORIDE CONTAINING ALKYL ACRYLATE AND ALKYL METHACRYLATE SEQUENTIALLY POLYMERIZED THEREON

BACKGROUND OF THE INVENTION

The present invention relates to an improved vinyl chloride polymer having excellent processability and physical properties which is useful for providing composite materials, and more particularly to a particulate vinyl chloride polymer composition having improved flowability, heat stability, rigidity and impact resistance and further having an excellent heat resistance, and a process for the preparation thereof.

Polyvinyl chloride has excellent chemical and mechanical properties and is inexpensive, and therefore it has been employed industrially in large quantities. However, since the polyvinyl chloride is poor in processability and heat stability, and since the processing temperature is close to the thermal decomposition temperature, it is difficult to adopt a manner such as lowering a melt viscosity of the polymer at high temperatures like ordinary resins and the polyvinyl chloride has had to be processed in the state that the flowability is low. In particular, in case of admixing the polyvinyl chloride with large quantities of an inorganic filler for imparting the rigidity and heat resistance to the obtained moldings or for cost down, the processability and heat stability are remarkably lowered and the molding becomes impossible.

It is known to use a polyvinyl chloride having a low degree of polymerization in order to improve the molding processability, especially flowability. However, a polyvinyl chloride having a low degree of polymerization has the defects that not only it is poor in heat stability, but also it causes the lowering of impact resistance and tensile strength. Also, in order to improve the molding processability, it is proposed to copolymerize vinyl chloride with a comonomer such as an alkyl acrylate or an alkyl vinyl ether. However, such a vinyl chloride copolymer has the defect that the heat stability of the polymer or the heat resistance and tensile strength of the obtained moldings are lowered, though the melt viscosity is lowered by the copolymerization of the comonomer and whereby the flowability is improved. Besides, it is known to add a plasticizer and a lubricant to polyvinyl chloride for improving the molding processability. However, the addition thereof in large quantities is required in obtaining a sufficient flowability, and it causes problems that the heat resistance and rigidity are lowered, gelation is ununiform or insufficient and bleeding takes place.

SUMMARY OF THE INVENTION

It is an object of the present invention to provide an improved vinyl chloride polymer having excellent processability and heat stability.

A further object of the invention is to provide a particulate vinyl chloride polymer which has improved melt-flowability and heat stability and which is particularly suitable for blending with large quantities of inorganic fillers and is capable of providing molded articles having excellent physical properties, e.g. heat resistance, rigidity and impact resistance.

Another object of the invention is to provide a process for preparing an improved vinyl chloride polymer having excellent processability and heat stability.

These and other objects of the present invention will become apparent from the description hereinafter.

It has now been found that the above-mentioned objects can be attained by filling 2 to 20 parts by weight of, per 100 parts by weight of a vinyl chloride polymer, a specific alkyl acrylate polymer into previously formed porous particles of the vinyl chloride polymer.

Accordingly, in accordance with the present invention, there is provided a particulate vinyl chloride polymer composition which comprises porous particles of a vinyl chloride polymer and 2 to 20 parts by weight of, per 100 parts by weight of the vinyl chloride polymer, an acrylic polymer mixture of a homopolymer of an alkyl acrylate having a $C_4$ to $C_{18}$ alkyl group, a homopolymer of an alkyl methacrylate having a $C_1$ to $C_4$ alkyl group and a copolymer of said acrylate and methacrylate, the weight ratio of the acrylate component to the methacrylate component in said acrylic polymer mixture being from 90/10 to 60/40 and said porous particles being substantially filled with said acrylic polymer mixture.

The particulate vinyl chloride polymer composition of the invention having excellent processability and heat stability is prepared by impregnating porous vinyl chloride polymer particles with the alkyl acrylate, polymerizing the alkyl acrylate, and adding and polymerizing the alkyl methacrylate, while the polymerization of the alkyl acrylate is in progress. A blend of the particulate vinyl chloride polymer composition of the invention, namely a vinyl chloride polymer powder containing acrylate polymers, and an inorganic filler with or without other additives for vinyl chloride polymers has improved melt-flowability and heat stability and provides molded articles having excellent heat resistance and physical properties.

DETAILED DESCRIPTION

In the present invention, it is necessary to conduct the two stage polymerization where an alkyl acrylate is first impregnated in porous particles of a vinyl chloride polymer and is polymerized, and in the course of the polymerization of the alkyl acrylate, an alkyl methacrylate is then added to the reaction system and is polymerized. In the case where the alkyl acrylate is impregnated in the porous vinyl chloride polymer particles and is polymerized and the thus obtained powder is then blended with an alkyl methacrylate homopolymer or copolymer which is known as an improver of the processability, it is observed that the melt-flowability is rather lowered. When the two stage polymerization of the alkyl acrylate and the alkyl methacrylate is conducted according to the present invention, the melt-flowability of vinyl chloride polymers is remarkably improved as compared with the above vinyl chloride polymers obtained by the impregnation and polymerization of only the alkyl acrylate followed by blending with alkyl methacrylate polymers. Also, the powder obtained by impregnating and polymerizing a monomer mixture of the alkyl acrylate and methacrylate in the porous vinyl chloride polymer particles has an improved melt-flowability, but is poor in impact resistance.

Like this, the particulate vinyl chloride polymer of the present invention is excellent in heat stability as well as melt-flowability, and accordingly it is very useful, particularly for the cases where a large quantity of an inorganic filler is employed for the purpose of improving physical properties such as heat resistance and rigidity or decreasing in cost.

Vinyl chloride polymers (hereinafter referred to as "PVC") used in the present invention include vinyl chloride homopolymer and copolymers of vinyl chloride and other copolymerizable monomers, e.g. vinyl acetate, ethylene, propylene and vinylidene chloride. In case of the copolymers, those containing at least 75% by weight of the vinyl chloride component are preferable. The PVC may be those obtained by post-chlorination. The degree of the polymerization of PVC is not particularly limited, and is suitably selected according to the uses and purposes. For instance, in case of using the product of the present invention in the field setting importance on the melt-flowability such as injection molding, PVC having a degree of polymerization of 300 to 800 is preferred. In case of setting importance on mechanical characteristics as required in structures produced by extrusion, PVC having a degree of polymerization of not less than 800 is preferred.

It is necessary that the PVC particles used in the present invention have a porous structure. The PVC particles prepared by known suspension or bulk polymerization methods are preferably employed as starting porous PVC particles. In general, the PVC particles having a prticle size of 30 to 150 $\mu$m., especially 100 to 150 $\mu$m., are employed as a starting material in the present invention. Also, it is preferable that the pore diameter of the PVC particles is from about 0.15 to about 16 $\mu$m. and the volume of pores in the particles is from 2 to 100 ml./100 g. PVC, especially 3 to 50 ml./100 g. PVC.

The acrylic polymer produced by the impregnation and polymerization of alkyl acrylate and methacrylate is a mixture of an alkyl acrylate homopolymer, an alkyl methacrylate homopolymer and a copolymer of the alkyl acrylate and methacrylate. The amount of the acrylic polymer component included in the product of the present invention is from 2 to 20 parts by weight per 100 parts by weight of PVC. When the amount is less than 2 parts by weight, the flowability is not improved, and when the amount is more than 20 parts by weight, the heat stability and heat resistance is lowered, and in addition, the dispersibility of an inorganic filler into the improved PVC of the invention is lowered. It is also necessary that the weight ratio of the alkyl acrylate component to the alkyl methacrylate component in the acrylic polymer as a whole is from 90/10 to 60/40. When the ratio is outside the above range, improvement of the flowability is a little.

The alkyl acrylates having a $C_4$ to $C_{18}$ alkyl group, preferably a $C_6$ to $C_{18}$ alkyl group, are employed in the present invention. When the carbon number of the alkyl group is less than 4, improvement of the flowability is a little. When the carbon number of the alkyl group is not less than 4, especially not less than 6, the effect on the improvement of flowability is remarkably increased, and exhibited particularly in the case where the product of the invention is blended with a large quantity of an inorganic filler. Examples of the alkyl acrylate are, for instance, butyl ester, isobutyl ester, amyl ester, hexyl ester, 2-ethylhexyl ester, octyl ester, decyl ester, lauryl ester, cetyl ester and stearyl ester of acrylic acid. The alkyl acrylates may be employed alone or in admixture thereof. The alkyl acrylates may also be employed, as occasion demands, in admixture with an equal or less amount of other polymerizable monomers such as cyclohexyl acrylate, benzyl acrylate, 2-hydroxyethyl acrylate, methoxypolyethylene glycol acrylate, glycidyl acrylate, ethyl acrylate, styrene and acrylonitrile.

Examples of the alkyl methacrylates having a $C_1$ to $C_4$ alkyl group employed in the present invention are, for instance, methyl ester, ethyl ester, propyl ester and butyl ester of methacrylic acid. The alkyl methacrylates may be employed alone or in admixture thereof.

In the preparation of the improved particulate PVC of the prsent invention, usual polymerization processes such as suspension polymerization, bulk polymerization and gas phase polymerization are adoptable. Suspension polymerization process which has been industrially, widely utilized is convenient. For instance, the improved particulate PVC of the invention is prepared as follows: The porous PVC particles are dispersed into water to form a slurry. The ratio of the PVC particles to water is usually from 1/1 to 1/10 by weight. A mixture of an alkyl acrylate monomer and a polymerization initiator which may further contain a chain transfer agent is added to the slurry, and impregnated in the porous PVC particles at a temperature that the polymerization does not substantially proceed. The impregnation is usually carried out by agitating the slurry in nitrogen stream for 20 to 120 minutes. The temperature of the polymerization system is then raised to start the polymerization. It is desirable to carry out the polymerization at a temperature of 50° to 100° C., especially 60° to 90° C., in points of the polymerization rate and the deterioration of PVC. It is necessary that at least a part of an alkyl methacrylate monomer is added to the polymerization system in the course of the polymerization of the alkyl acrylate. Preferably, at least 50% by weight of the methacrylate monomer used, especially all of the methacrylate monomer used, is added to the polymerization system at one time, intermittently or continuously when the polymerization conversion of the acrylate monomer reaches 50 to 90% by weight. The polymerization is further continued, usually for 0.5 to 5 hours. A polymerization initiator and a chain transfer agent may be additionally employed, or those remaining in the system without being consumed in the polymerization of the acrylate may be utilized.

Oil-soluble radical polymerization initiators are empolyed as polymerization initiators, e.g. known peroxides, azo compounds and redox catalysts consisting of oil-soluble hydroperoxides and reducing agents. In particular, there is preferred a combined initiator system of an oil-soluble peroxide having a 10 hour half-life temperature of not more than 50° C. and a chain transfer agent. The term "10 hour half-life temperature" as used herein means the temperature at which 10 hours are required in reducing the concentration of an initiator by half by the thermal decomposition. The oil-soluble peroxide having a 10 hour half-life temperature of not more than 50° C. has a very high catalytic activity, and by the use thereof, it is possible to increase the polymerizability of alkyl acrylates and methacrylates and to attain a high polymerization conversion. On the other hand, however, there are cases where a large quantity of the gelled portion insoluble in tetrahydrofuran is produced in the formed acrylic polymers, and as a result, the melt-flowability of the obtained product is impaired and the processability cannot be improved. The use of the oil-soluble peroxide having a 10 hour half-life temperature of not more than 50° C. in combination with a chain transfer agent can inhibit the production of the gelled portion, so the improved particulate PVC having excellent melt-flowability and heat stability can be obtained.

Examples of the oil-soluble peroxide having a 10 hour half-life temperature of not more than 50° C. are peresters such as acetyl cyclohexylsulfonyl peroxide, acetyl sec-heptylsulfonyl peroxide and tert-butyl peroxyneodecanoate; diacyl peroxides such as di-isobutyryl peroxide; peroxydicarbonates such as di-isopropyl peroxydicarbonte, di-n-propyl peroxydicarbonate, di-2-ethoxyethyl peroxydicarbonate, di-methoxyisopropyl peroxydicarbonate, di-2-ethylhexyl peroxydicarbonate, di-isobutyl peroxydicarbonate, bis(4-tert-butylcyclohexyl)peroxydicarbonate and di-3-methoxybutyl peroxydicarbonate; and the like. The amount of such an oil-soluble peroxide used varies depending on the polymerization temperature and other conditions, and is usually selected from 0.1 to 10% by weight based on the total weight of the monomers used.

Various compounds known as chain transfer agents can be employed in the present invention. Typical examples of the chain transfer agent are, for instance, mercaptans such as butyl mercaptan, n-dodecyl mercaptan, tert-dodecyl mercaptan, mercaptoethanol, mercaptopropanol, thioglycollic acid, methylthioglycollic acid and thiolactic acid; and olefins such as dichloroethylene, trichloroethylene, 2,4,-diphenyl-4-methyl-1-pentene (i.e. dimer of α-methylstyrene) and terpinen (i.e. trimer of isoprene). The amount of the chain transfer agent varies somewhat depending on the kind thereof, the kind and amount of the oil-soluble peroxide used in combination therewith and the polymerization conditions such as temperature. In general, the chain transfer agent is employed in an amount of 0.1 to 10% by weight based on the total amount of the monomers used.

After the completion of the polymerization, the product is recovered in a usual manner. The improved particulate PVC so obtained has a particle size of 50 to 200 μm. The polymerization of the monomers almost takes place inside the PVC particles, and the produced acrylic polymers are substantially included in the PVC particles. It is scarcely observed that the acrylic polymers, e.g. a methacrylate homopolymer, are produced on the surface of the PVC particles. The improved PVC of the present invention has excellent melt-flowability and heat stability, and accordingly the processability is very good. The melt-flowability may be estimated by the flow rate of a molten resin. The flow rate as shown herein refers to a value measured by employing a flow tester of Koka type (made by Simadzu Corporation) having a nozzle of 1 mm. in diameter and 10 mm. in length under conditions of 210° C. in temperature and 100 kg./cm.$^2$ in loading. The flow rate of the improved PVC of the invention usually falls within the range of $5 \times 10^{-2}$ to $50 \times 10^{-2}$ ml./sec., though it varies depending on the degree of polymerization of the PVC used as a starting material. In general, when PVC is blended with inorganic fillers, the heat stability is remarkably lowered. The improved PVC of the invention has an improved heat stability and can be blended with a large quantity of inorganic fillers without causing problems in molding.

Since the improved PVC of the invention has a high melt-flowability and an excellent heat stability, it can be blended with a large quantity of an inorganic filler to provide a molding composition which is moldable with good processability. The inorganic fillers to be blended with the improved PVC of the present invention include, for instance, barium carbonate, barium sulfate, calcium carbonate, gypsum, clay, talc, mica, calcium silicate, titanium dioxide, carbon black, graphite, wollastonite, asbestos, glass fiber, carbon fiber, various metal powders and whisker. The filler is usually employed in an amount of 2 to 100 parts by weight per 100 parts by weight of the improved PVC of the invention. When the amount of the filler is less than 2 parts by weight, effects to be produced by the addition of the filler are hard to be obtained. When the amount of the filler is more than 100 parts by weight, the melt-flowability of the composition is remarkably lowered.

Other additives which are usually employed in processing of PVC, e.g. heat stabilizer, antioxidant, ultraviolet absorbent, plasticizer, lubricant, pigment, improver for processability and improver for impact resistance, may be suitably employed as well as the inorganic filler in processing the improved PVC of the present invention. A blend of the improved PVC and an inorganic filler, and if necessary, further with other additives is processed in a usual manner. For instance, the improved PVC is blended with an additive by roll mill, Bumbury's mixer, etc. and molded by extruder, injection molding machine, etc.

The present invention is more specifically described and explained by means of the following Examples, in which all parts are by weight. It is to be understood that the present invention is not limited to the Examples and various changes and modifications may be made in the invention without departing from the spirit and scope thereof.

In the following Examples, the heat deformation temperature was measured according to ASTM-D-648 (loading: 18.6 kg./cm.$^2$), and the impact strength was measured according to ASTM-D-256 ($\frac{1}{4}$ inch bar, notched).

Also, the heat stability was estimated as follows: A PVC blend is kneaded by a Brabender plastograph at 180° C. in chamber temperature and 60 r.p.m. in number of rotation of screw. The torque rises, reaches the steady state (steady torque) and thereafter further rises. There is measured the time (minute) from starting the kneading to the point at which the torque rises by 0.1 m.-kg. from the steady torque.

EXAMPLES 1 TO 6

The resin/water ratio in a PVC slurry which was obtained by a usual suspension polymerization and in which the PVC had an average degree of polymerization of about 500, was adjusted to $\frac{1}{2}$ by weight. To the slurry was added at room temperature a mixture of, per 100 parts of PVC, 6 parts of octyl acrylate or lauryl acrylate, 0.18 part of bis(4-t-butylcyclohexyl)peroxydicarbonate (commercial name "Perkadox 16" made by Kayaku Noury Corporation) (hereinafter referred to as "PKD") and 0.04 part of mercaptoethanol (made by Wako Pure Chemical Industries, Ltd.) The slurry was agitated in nitrogen stream at room temperature for 30 minutes to impregnate the mixture in the PVC particles. The temperature of the system was then elevated to 75° C. to start the polymerization. After 1.5 hours from the elevation of the temperature, the polymerization conversion of the acrylate reached 80%. At that point of time, a mixture of 2 parts of methyl methacrylate and 0.03 part of PKD was added to the system, and polymerization was further continued for 1.5 hours. The slurry was dehydrated and dried in a usual manner to give an improved PVC powder.

To 100 parts of the above improved PVC were added 0, 30 or 60 parts of calcium carbonate (commercial name "SSB" made by Shiraishi Calcium Kaisha Ltd.), 3 parts of dibutyl tin maleate, 1 part of dibutyl tin mercaptide, 0.5 part of butyl stearate and 2 parts of low molecular weight polyethylene wax. They were blended at an elevated temperature by a high speed mixer. The blend was pelletized at 180° C. by a single-screw extruder, and was then molded at 210° C. by an injection molding machine to give specimens for measurement. With respect to the blends and the moldings obtained therefrom, the melt-flowability, the heat stability and the heat deformation temperature were measured.

The results are shown in Table 1.

COMPARATIVE EXAMPLES 1 TO 3

The molding was carried out in the same manner as in the preceding Examples except that a PVC having an average degree of polymerization of about 500 was blended with the additives.

The results are shown in Table 1.

COMPARATIVE EXAMPLES 4 TO 6

The polymerization and molding were carried out in the same manner as in the preceding Examples except that propyl acrylate was employed as an alkyl acrylate.

The results are shown in Table 1.

TABLE 1

| | Alkyl acrylate | Amount of $CaCO_3$ (part) | Flow rate ($10^{-2}$ ml./sec.) | Heat deformation temp. (°C.) | Heat stability (min.) |
|---|---|---|---|---|---|
| Ex. 1 | Octyl ester | 0 | 16.1 | 58 | 13.0 |
| Ex. 2 | Octyl ester | 30 | 4.8 | 59 | 6.6 |
| Ex. 3 | Octyl ester | 60 | 1.3 | 60 | 3.4 |
| Ex. 4 | Lauryl ester | 0 | 17.0 | 57 | 13.5 |
| Ex. 5 | Lauryl ester | 30 | 5.2 | 59 | 6.5 |
| Ex. 6 | Lauryl ester | 60 | 1.5 | 60 | 4.0 |
| Com. Ex. 1 | — | 0 | 6.8 | 60 | 7.0 |
| Com. Ex. 2 | — | 30 | 1.5 | 62 | 4.0 |
| Com. Ex. 3 | — | 60 | 0.3 | 63 | — |
| Com. Ex. 4 | Propyl ester | 0 | 15.5 | 58 | 12.4 |
| Com. Ex. 5 | Propyl ester | 30 | 3.2 | 60 | 5.2 |
| Com. Ex. 6 | Propyl ester | 60 | 0.6 | 60 | — |

As is clear from Table 1, PVC modified by the two stage impregnation-polymerization using the octyl or lauryl ester as an alkyl acrylate is largely improved in melt-flowability without lowering the heat resistance. On the other hand, in case of using the propyl ester as an alkyl acrylate, the lowering of the flowability is large when the product is blended with calcium carbonate.

EXAMPLE 7 AND COMPARATIVE EXAMPLES 7 TO 9

The procedures of Example 5 were repeated except that the kind or amount of the acrylic monomer was changed as shown in Table 2.

The results are shown in Table 2 together with the results for Example 5.

TABLE 2

| | Monomer in 1st stage (part) | | Monomer in 2nd stage (part) | Characteristics | | |
|---|---|---|---|---|---|---|
| | Lauryl acrylate | Methyl methacrylate | Methyl methacrylate | Flow rate ($10^{-2}$ml./sec.) | Heat deformation temp. (°C.) | Impact strength (kg · cm./cm.$^2$) |
| Ex. 5 | 6 | — | 2 | 5.2 | 59 | 5.1 |
| Ex. 7 | 8 | — | 2 | 6.9 | 57 | 6.0 |
| Com. Ex. 7 | 6 | — | — | 3.7 | 59 | 1.8 |
| Com. Ex. 8 | 6 | 2 | — | 5.0 | 58 | 2.8 |
| Com. Ex. 9 | 6 | — | 6 | 4.0 | 60 | 1.5 |

As is clear from Table 2, the products of Comparative Examples where an alkyl methacrylate is not employed or a mixture of alkyl acrylate and methacrylate is employed and the impregnation and polymerization are conducted in one stage, are low in flowability and impact strength as compared with the improved PVC of the present invention.

In addition to the ingredients used in the Examples, other ingredients can be used in the Examples as set forth in the specification to obtain substantially the same results.

What we claim is:

1. A particulate modified vinyl chloride polymer prepared by a process which comprises: (1) impregnating porous particles of a vinyl chloride polymer with an alkyl acrylate having a $C_4$ to $C_{18}$ alkyl group, (2) polymerizing said alkyl acrylate, (3) adding an alkyl methacrylate having a $C_1$ to $C_4$ alkyl group to the polymerization system in the course of said polymerization of said alkyl acrylate, and (4) continuing said polymerization, the total amount of said alkyl acrylate and said alkyl methacrylate being from 2 to 20 parts by weight per 100 parts by weight of said porous particles, and the weight ratio of said alkylacrylate to said alkyl methacrylate being from 90/10 to 60/40.

2. The composition of claim 1, wherein said alkyl acrylate has an alkyl group having 6 to 18 carbon atoms.

3. The particulate modified vinyl chloride polymer of claim 1, wherein said alkyl methacrylate is added to the polymerization system when the polymerization conversion of the alkyl acrylate is from 50 to 90% by weight.

4. A process for preparing a particulate vinyl chloride polymer composition which comprises the steps of impregnating porous particles of a vinyl chloride polymer with an alkyl acrylate having a $C_4$ to $C_{18}$ alkyl group, polymerizing said alkyl acrylate, adding an alkyl methacrylate having a $C_1$ to $C_4$ alkyl group to the polymerization system in the course of said polymerization of said alkyl acrylate, and continuing said polymerization, the total amount of said alkyl acrylate and said alkyl methacrylate being 2 to 20 parts by weight per 100 parts by weight of said vinyl chloride polymer, and the weight ratio of said alkyl acrylate to said alkyl methacrylate being from 90/10 to 60/40.

5. The process of claim 4, wherein said alkyl methacrylate is added to the polymerization system at the time when the polymerization conversion of said alkyl acrylate is from 50 to 90% by weight.

6. A polyvinyl chloride mixture comprising a particulate modified vinyl chloride polymer and 2 to 100 parts by weight of an inorganic filler per 100 parts by weight of said particulate modified vinyl chloride polymer, said particulate modified vinyl chloride polymer being prepared by a process which comprises: (1) impregnating porous particles of a vinyl chloride polymer with an alkyl acrylate having a $C_4$ to $C_{18}$ alkyl group, (2) polymerizing said alkyl acrylate, (3) adding an alkyl methacrylate having a $C_1$ to $C_4$ alkyl group to the polymerization system in the course of said polymerization of said alkyl acrylate, and (4) continuing said polymerization, the total amount of said alkyl acrylate and said alkyl methacrylate being from 2 to 20 parts by weight per 100 parts by weight of said porous particles, and the weight ratio of said alkyl acrylate to said alkyl methacrylate being from 90/10 to 60/40, said porous particles being substantially filled with the acrylate polymer and the methacrylate polymer.

7. The mixture of claim 6, wherein said inorganic filler is calcium carbonate.

* * * * *